(12) United States Patent
Chansarkar et al.

(10) Patent No.: US 7,881,407 B2
(45) Date of Patent: Feb. 1, 2011

(54) SYSTEMS AND METHODS FOR MITIGATING MULTIPATH SIGNALS

(75) Inventors: Mangesh Chansarkar, Irvine, CA (US); Gang Xie, Fullerton, CA (US); Sanjai Kohli, Torrance, CA (US)

(73) Assignee: SIRF Technology, Inc., San Jose, CA (US)

( * ) Notice: Subject to any disclaimer, the term of this patent is extended or adjusted under 35 U.S.C. 154(b) by 157 days.

(21) Appl. No.: 12/199,066

(22) Filed: Aug. 27, 2008

(65) Prior Publication Data
US 2008/0309553 A1 Dec. 18, 2008

Related U.S. Application Data

(63) Continuation-in-part of application No. 10/835,948, filed on Apr. 30, 2004.

(51) Int. Cl.
*H04L 27/00* (2006.01)
*H03D 1/04* (2006.01)
*G01S 19/00* (2010.01)

(52) U.S. Cl. ............... 375/316; 375/343; 342/357.2

(58) Field of Classification Search .......... 375/316, 375/340, 343; 340/539.1, 539.13; 701/207, 701/213, 215; 342/352, 357.01, 357.06, 342/357.12, 357.15, 350, 357.2, 357.21, 342/357.25, 357.22
See application file for complete search history.

(56) References Cited

U.S. PATENT DOCUMENTS

| | | | | | |
|---|---|---|---|---|---|
| 5,949,815 | A | * | 9/1999 | Pon | 375/150 |
| 2002/0165669 | A1 | * | 11/2002 | Pinto et al. | 701/213 |
| 2004/0266457 | A1 | * | 12/2004 | Dupray | 455/456.5 |
| 2007/0096978 | A1 | * | 5/2007 | van Diggelen et al. | 342/357.02 |

* cited by examiner

*Primary Examiner*—Tesfaldet Bocure
(74) *Attorney, Agent, or Firm*—Thomas, Kayden, Horstemeyer & Risley, LLP (57) ABSTRACT

Systems and methods for mitigating multipath signals in a receiver are provided. In this regard, a representative system, among others, includes a receiver comprising an antenna being configured to receive signals from a plurality of satellites, and a computing device being configured to: generate pseudorange measurements based on the received satellites signals, process the generated pseudorange measurements to reduce its pseudorange residuals based on statistical modeling in order to mitigate multipath errors, and compute navigation solutions based on the processed pseudorange measurements. A representative method, among others, for mitigating multipath signals in a receiver, comprises: receiving the pseudorange measurements; processing the received pseudorange measurements to reduce its pseudorange residuals based on statistical modeling in order to mitigate multipath errors; and computing navigation solutions based on the processed pseudorange measurements.

35 Claims, 9 Drawing Sheets

FIG. 10

SYSTEMS AND METHODS FOR MITIGATING MULTIPATH SIGNALS

CROSS-REFERENCE TO RELATED APPLICATION

This application is a continuation-in-part of copending U.S. utility application entitled, "Spread Spectrum Receiver With Multi-Bit Correlator," having Ser. No. 10/835,948, filed Apr. 30, 2004, which is entirely incorporated herein by reference.

TECHNICAL FIELD

The present disclosure is generally related to navigation and, more particularly, is related to systems and methods for mitigating multipath signals in receivers.

BACKGROUND

Typically, a global positioning system (GPS) can provide a user with a position, velocity, and time (PVT) solution, sometimes referred to as a navigation solution. The global positioning system includes a GPS receiver which typically incorporates current measurements from four or more GPS satellites to update its most recent PVT solution using some navigation algorithm. Pseudorange measurements can be referred to as the range or distance between a satellite and the GPS receiver. To determine a receiver position, the GPS receiver typically determines the ranges to at least three satellites as well as their positions at the time of transmitting. The satellites positions can be calculated for any point in time with known satellite orbital parameters, which are broadcast by the satellites.

The pseudorange measurements can be computed using measured time of signal transmission from the satellite to the GPS receiver, multiplied by the speed of light. Pseudorange measurements are called "pseudo" since the internal clock time of the receiver and GPS time are normally unsynchronized resulting in an unknown, such as, the receiver clock offset $\Delta t$, among others, that is typically computed by the navigation algorithm. Thus, with at least four signals, solutions for the receiver position along the x-, y-, z- and $\Delta t$-axes can be computed.

To achieve accuracy and integrity, the GPS receiver typically includes algorithms that contain some failure detection and exclusion (FDE) functions to detect and exclude failed pseudorange measurements. GPS measurements can be affected by multipath signals, where the GPS signals reflect off, for example, surrounding terrain, buildings, canyon walls, and hard ground, among others. When a signal is reflected, the signal typically passes through a longer path than the corresponding direct-path signal. Thus, the multipath signal can affect the pseudorange measurements, resulting in potential unexpected errors. Accordingly, pseudorange residuals, also known as, innovations or errors, can be referred to as a pseudorange measurement minus an estimated range. Many FDE functions can determine whether the pseudorange measurements are normal or failures based typically on the magnitude of the pseudorange residuals. It should be noted that since one pseudorange measurement typically corresponds to a pseudorange residual, these two terms sometimes can be exchanged. For example, processing pseudorange measurement residual has the same meaning as processing pseudorange measurement. The two terms will be or become apparent to one with skill in the art upon examination of the following drawings and detailed description.

A large pseudorange residual typically indicates a failure or a potential failure. The FDE function can either exclude or de-weight the failed measurements in the navigation computation. However, the FDE algorithms have a certain probability of false alarms, such as, for example, mistakenly excluding good measurements, and a certain probability of misdetections, such as, for example, failing to detect bad measurements. Excluding measurements can adversely affect satellite geometry distribution or, in other words, dilution of position (DOP), which, in turn, can magnify measurement errors into position solution errors. In addition, excluding a pseudorange measurement among only three or four available pseudorange measurements can reduce GPS availability.

De-weighing a pseudorange measurement is often achieved by supposing that the error distribution is a zero-mean Gaussian and then by inflating its error variance. Unfortunately, the de-weighing mechanism has some deficiencies for utilizing failed measurements. For example, multipath error is usually not zero-mean; thus, simply inflating the error variance of a zero-mean Gaussian does not correctly reflect its actual error characteristics. In another example, received multipath signals can last longer when the GPS receiver is stationary or slowly moving than when the GPS receiver is fast moving. Any improper mitigation of a multipath effect can potentially cause the position fix to drift away after a certain amount of time when the GPS receiver is stationary or slowly moving.

SUMMARY

Systems and methods for mitigating multipath signals in a receiver are provided. In this regard, a representative system, among others, includes a receiver comprising an antenna being configured to receive signals from a plurality of satellites, a computing device being configured to: generate pseudorange measurements based on the received satellites signals, process the generated pseudorange measurements to reduce their pseudorange measurement residuals based on statistical modeling in order to mitigate multipath errors, and compute navigation solutions based on the processed pseudorange measurements.

A representative method, among others, for mitigating multipath signals in a receiver, comprising: receiving the pseudorange measurements; processing the received pseudorange measurements to reduce their pseudorange residuals based on statistical modeling; and computing navigation solutions based on the processed pseudorange measurements.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which multipath signals are mitigated in a receiver.

Figure 1:
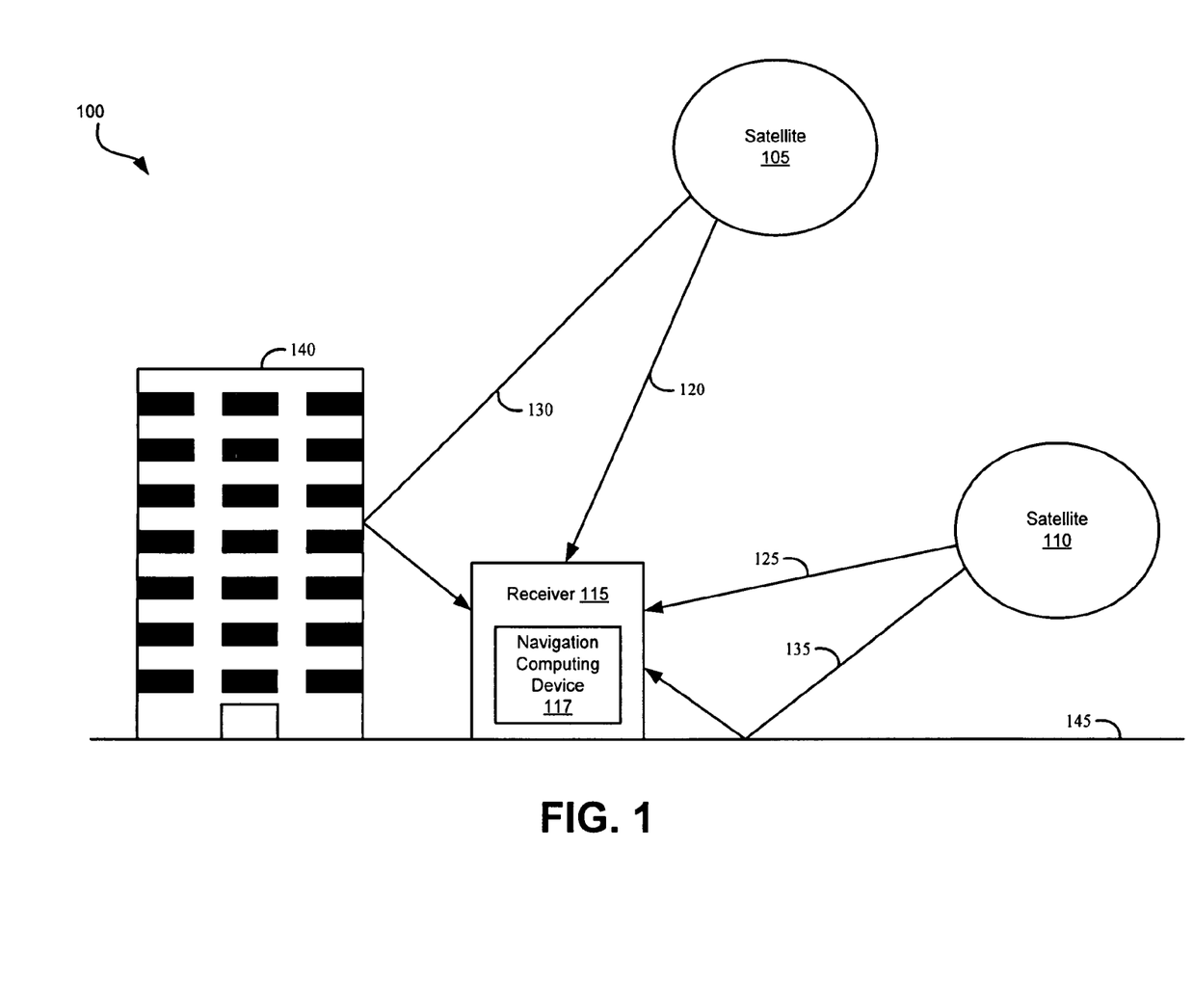
FIG. 1 is a block diagram that illustrates a system overview for determining a location of a receiver that mitigates multipath signals.

FIG. 1 is a block diagram that illustrates a system overview for determining a location of a receiver 115 that mitigates multipath signals. A system 100 comprises a plurality of satellites 105, 110 and a receiver 115. Although only one receiver 115 is shown in the system 100, the system 100 can include multiple receivers 115. The satellites 105, 110 include, but are not limited to, GPS satellites and other global navigation satellite system (GNSS) satellites, such as, for example, the Galileo and the GLONASS. The satellites 105, 110 generally orbit above the location of the receiver 115 at any given time.

The receiver 115 has subsystem components, such as, for example, a navigation computing device 117 and a receiving mechanism (not shown), among others. The receiving mechanism includes, but is not limited to, an antenna, a radio frequency (RF) front end, and a baseband digital signal processing (DSP), among others, for receiving and decoding GPS signals from the satellites 105, 110. The receiving mechanism further receives direct-path signals and any potential multipath signals to be used by the navigation computing device 117 for mitigating multipath effects on the navigational solutions. The receiving mechanism is described in relation to FIG. 2. A method of mitigating the multipath signals is described in relation to FIGS. 8 and 9. The navigational computing device 117 is further described in relation to FIGS. 2, 3, and 4.

The receiver 115 includes, but is not limited to, GPS timing receivers and navigation receivers, both of which can be further embedded into cell phones and Personal Digital Assistants (PDAs), and among others. The satellites 105, 110 transmit signals to the receiver 115, which uses the GPS signals to determine the location, speed, and direction of the receiver 115. The transmitted signals from the satellites 105, 110 reach the receiver 115 by two or more paths, which is a propagation phenomenon called multipath. Causes of multipath include refraction and reflection from terrestrial objects, such as mountains and buildings. For example, the transmitted signals 120, 125 from the respective satellites 105, 110 directly reach the receiver 115, the signals 120, 125 of which are known as direct-path signals. The transmitted signals 130, 135 from the satellites 105, 110 reflect from a building 140 and ground 145, respectively, the signals 130, 135 of which are know as indirect-path or reflected signals. Multipath is composed of the direct-path signal and one or more indirect-path signals from the same satellite. Reflected signals generally without direct-path signals are special cases of multipath.

Figure 2:
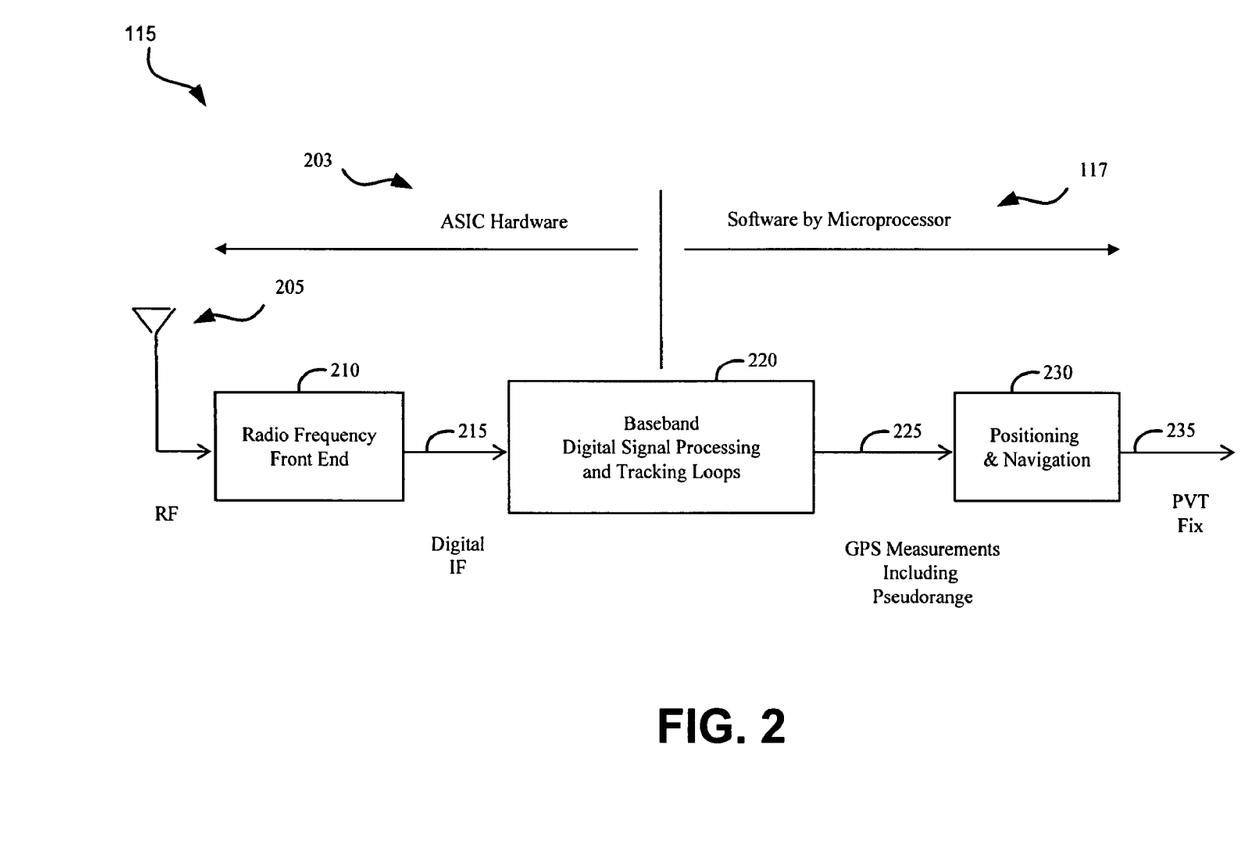
FIG. 2 is a block diagram that illustrates an embodiment of the receiver, such as that shown in FIG. 1.

FIG. 2 is a block diagram that illustrates an embodiment of the receiver 115, such as that shown in FIG. 1. The receiver 115 can include, but not limited to, an antenna 205, an application-specific integration circuit (ASIC) hardware 203 and a navigation computing device 117. The ASIC hardware 203 includes a radio frequency (RF) front end 210 and a baseband digital signal processing (DSP) 220. The navigation computing device 117 can be, but is not limited to, a microprocessor, among others, that includes a position, velocity, and time (PVT) unit 230 and tracking loops unit 220 which controls the DSP.

The antenna 205 receives GPS signals as well as multipath signals, and sends the received signals to the RF front end unit 210 that down-converts, magnifies, filters, and digitizes the received signals into digital immediate frequency (IF) signals 215. Such digital IF signals 215 are input to the baseband DSP unit 220 that acquires and tracks the received signals and then generates pseudorange measurements 225 according to the received signals. The baseband DSP unit 220 delivers the generated pseudorange measurements 225 to the PVT unit 230 that computes a GPS solution 235 or position fix based on the generated pseudorange measurements 225. The PVT unit 230 includes, but is not limited to, a navigation algorithm (not shown), among others, which can include a Least-Square (LS) or Kalman filtering, among others. A representative method of processing the position fix 235 is described in relation to FIG. 4. Alternatively or additionally, a Kalman filter can be utilized to mitigate multipath effects. Such subject matter is disclosed in U.S. Pat. No. 5,883,595, entitled "Method and Apparatus For Mitigating Multipath Effects and Smoothing Groundtracks in a GPS Receiver," having application Ser. No. 929,694, filed Sep. 15, 1997, which is entirely incorporated herein by reference.

Figure 3:
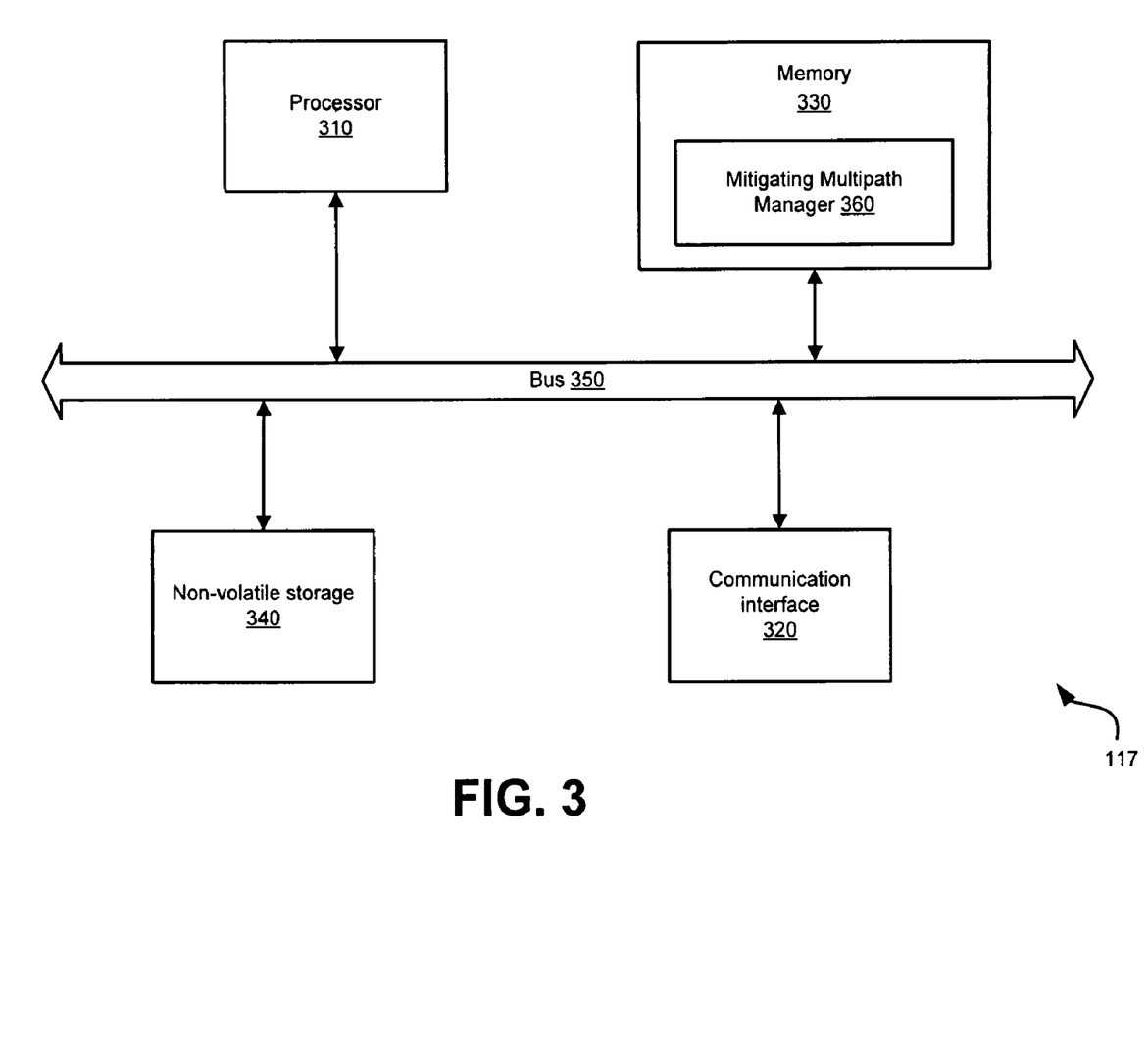
FIG. 3 is a block diagram that illustrates an embodiment of the architecture, functionality, and/or operation of a navigation computing device of the receiver, such as that shown in FIG. 1.

FIG. 3 is a block diagram that illustrates an embodiment of the architecture, functionality, and/or operation of the navigation computing device 117 of the receiver 115, such as that shown in FIG. 1. The computing device 117 contains a number of components that are well known in the art of GPS, including a processor 310, a communication interface 320, memory 330, and non-volatile storage 340. Examples of non-volatile storage include, for example, a hard disk, flash RAM, flash ROM, EEPROM, etc. These components are coupled via a bus 350. The memory 330 includes a mitigating multipath manager 360 that facilitates processing multipath signals using mitigating multipath techniques, which is described in relation to FIGS. 5 and 9. The memory 330 contains instructions which, when executed by the processor 310, implement at least a portion of the mitigating multipath manager 360. Omitted from FIG. 3 are other conventional components, known to those skilled in the art, that are unnecessary to explain the operation of the device 117.

The mitigating multipath technique can be implemented mostly in a PVT software (not shown). The PVT software is generally stored in some non-volatile memory 340, and loaded into Random Memory Access (RAM) memory and its instructions are executed by a microprocessor. However, the mitigating multipath technique can be embodied in any computer-readable medium for use by or in connection with an instruction execution system, apparatus, or device. Such instruction execution systems include any computer-based system, processor-containing system, or other system that can fetch and execute the instructions from the instruction execution system.

In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes, but is not limited to, a portable computer diskette, among others. Specific examples using optical technology include, but are not limited to, optical fiber and compact disc read-only memory (CD-ROM), among others.

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

Figure 4:
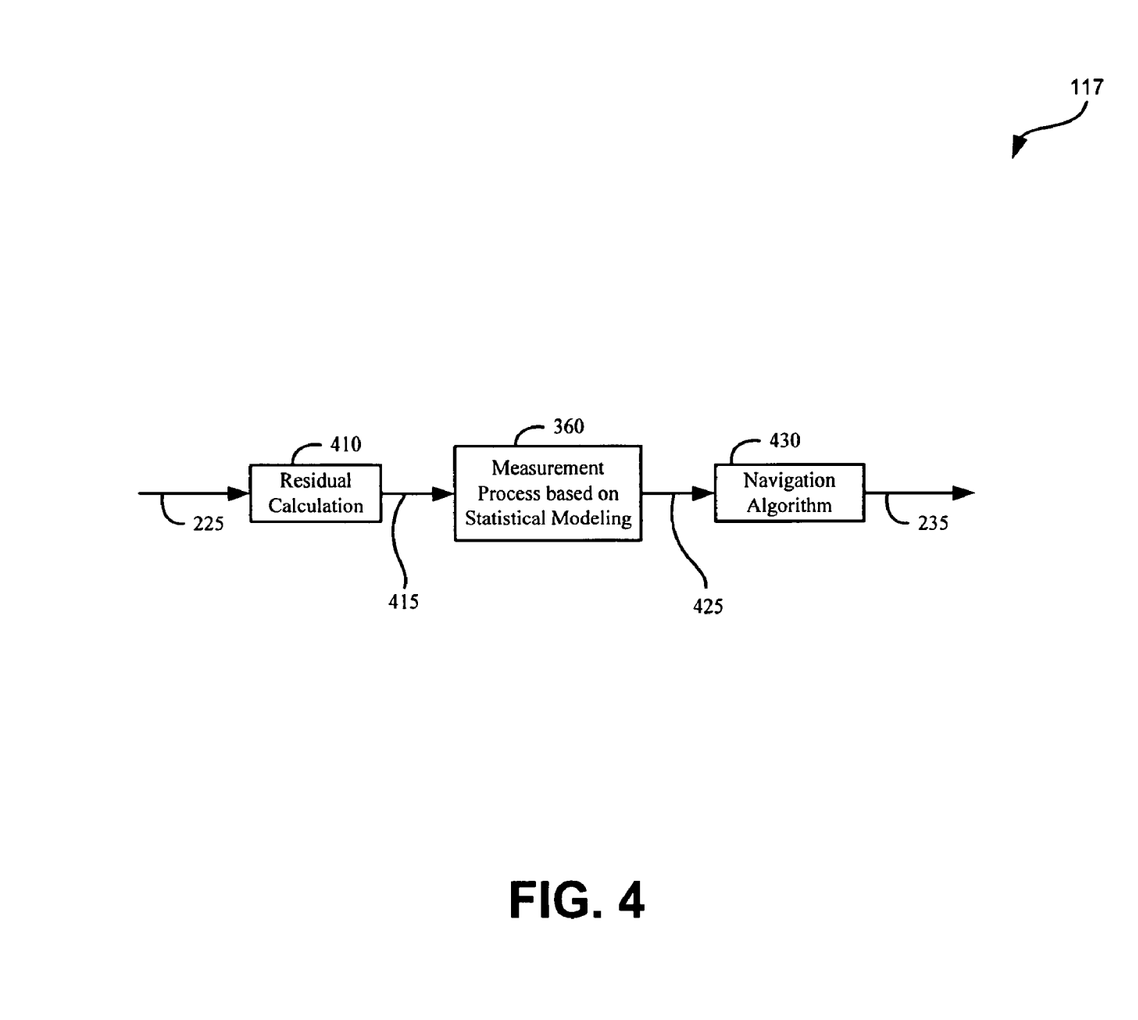
FIG. 4 is a block diagram that illustrates an embodiment of the architecture, functionality, and/or operation of the navigation computing device, such as that shown in FIG. 1.

FIG. 4 is a block diagram that illustrates an embodiment of the architecture, functionality, and/or operation of the navigation computing device 117, such as that shown in FIG. 1. The pseudorange measurements 225 are input to a residual calculation unit 410. As the residual calculation unit 410 collects the pseudorange measurements 225 from the DSP unit 220, the residual calculation unit 410 calculates pseudorange measurement residuals 415 by subtracting geometry ranges from the pseudorange measurements, where the geometry range is the distance from the satellite position to the estimated receiver position. The residual calculation unit 410 feeds the pseudorange measurement residuals 415 to the multipath mitigating manager 360, which changes or reduces at least a portion of the pseudorange residuals based on statistical modeling. The multipath mitigating manager 360 is described in relation to FIGS. 5 and 9. The multipath mitigating manager 360 transmits the modified portion of the pseudorange residuals to the navigation algorithm 430, which computes the receiver displacement from its previous estimate based on the modified portion of the pseudorange residuals. By modifying the pseudorange residuals, the multipath mitigating manager 360 can potentially improve the accuracy of the pseudorange measurements that is fed to the navigation algorithm 430, which, in turn, processes a potentially more accurate position fix 235 based on the modified pseudorange measurements.

Figure 5:
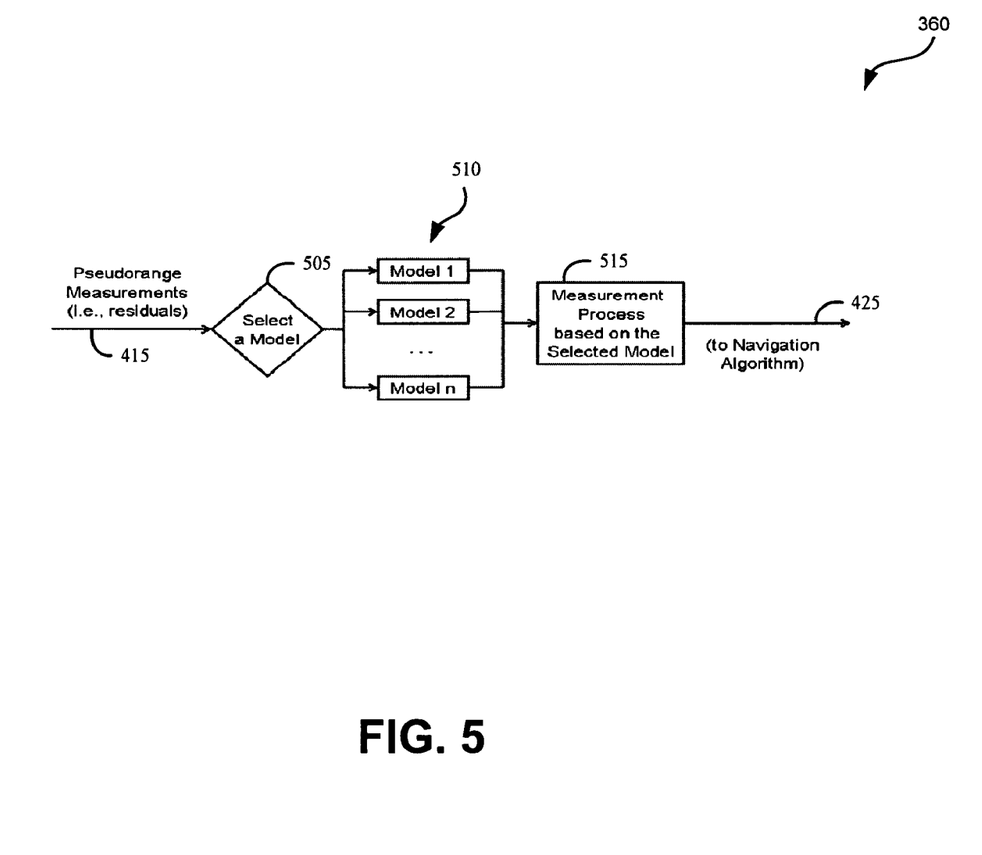
FIG. 5 is a block diagram that illustrates an embodiment of the architecture, functionality, and/or operation of a mitigating multipath manager of the navigation computing device, such as that shown in FIG. 3.

FIG. 5 is a block diagram that illustrates an embodiment of the architecture, functionality, and/or operation of the mitigating multipath manager 360 of the navigation computing device 117, such as that shown in FIG. 3. The mitigating multipath manager 360 receives the pseudorange measurements 225 and/or measurement residuals 415 and selects at least one statistical model module 510 at block 505 for each received pseudorange measurement based on, for example, its elevation angle. Block 505 is further described in relation to FIGS. 6 and 9. The pseudorange measurement residuals 415 are delivered to the selected statistical model module 510, which generates a statistical representation to describe the received pseudorange measurement based on statistical modeling. The statistical representation and modeling are further described in relation to FIGS. 6 and 7.

Generally, the statistical representation describes the probability of a given pseudorange residual that can occur. The statistical model module 510 is generally generated off-line. For example, the statistical model module 510 can be pre-computed based on real data collected. Since real-time residuals should also follow the pre-computed statistical representation, the multipath mitigating manager 360 can account for the probability of the pseudorange residual that can occur in the statistical modeling of pseudorange residual. Alternatively or additionally, the statistical model module 510 can possibly be constructed in real-time or on-line. A representative process of generating the statistical model module 410 is described in relation to FIGS. 6 and 7.

Based on the signal characteristics of a received pseudorange residual, at least one statistical model module 510 can be selected and the selected statistical model module 510 generates the statistical representation of the pseudorange residual. A measurement process algorithm 515 receives and processes the statistical representation of the pseudorange residual, generally computing a reduced value and an associated variance corresponding to the pseudorange residual. The processed pseudorange residual is delivered to the navigation algorithm 430, such as that shown in FIG. 4. The measurement process algorithm 515 is described in relation to FIG. 9.

Figure 6:
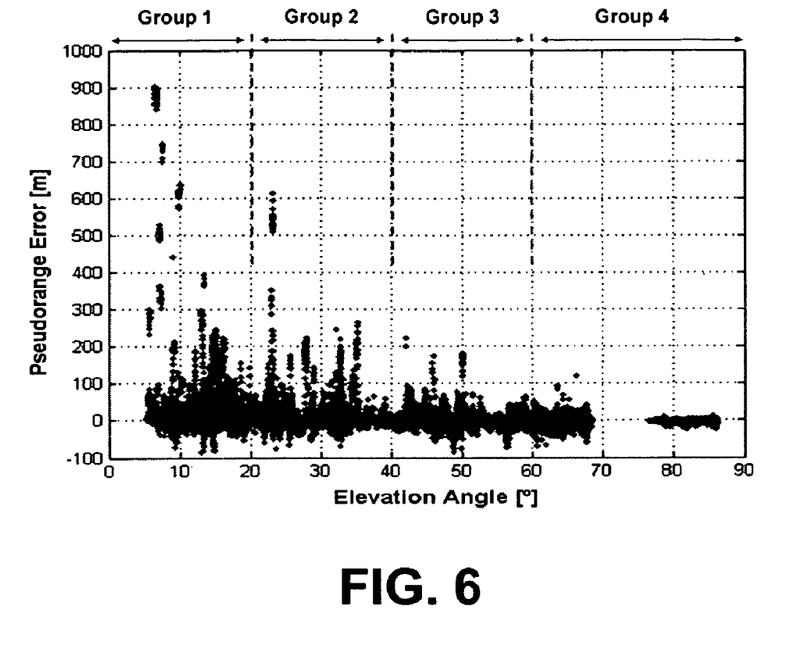
FIG. 6 is an exemplary graph illustrating pseudorange measurement residuals based on elevation angles that were off-line collected in several downtown urban canyon environments around the world and are utilized to generate a statistical model module, such as that shown in FIG. 5.

FIG. 6 is an exemplary graph illustrating pseudorange measurement residuals based on elevation angles that were off-line collected in several downtown urban canyon environments around the world and are utilized to generate a statistical model module, such as that shown in FIG. 5. Pseudorange residual can be defined as pseudorange measurement minus estimated range, where the pseudorange measurement are delivered by a target GPS receiver, which can also be the real-time target GPS receiver. The estimated range is the distance from the target receiver to the satellite.

In order to obtain accurate ranges and then pseudorange residuals, some inertial guidance system (INS) aided GPS reference receiver, which run in parallel with the target receiver, can be used to accurately estimate the target receiver positions. The reference receiver is generally used for collecting residual data and building residual model modules off-line.

It should be noted that a single statistical model module 510 can generate a statistical representation to describe a category of residual data. However, the single statistical model module 510 may have difficulties describing all reflection cases. As shown in FIG. 6, for example, high-elevation signals normally experience less multipath problems than low-elevation signals; therefore, their actual distribution should be different, and their statistical representations are calculated separately. Thus, for illustration purposes, FIG. 6 divides residual samples into 4 groups based on their elevation angles. Even in each group, the probability density function (PDF) of pseudorange errors can be expected to have a main body nearly centered at zero, mostly represented by normal direct-path signals, and a positive long tail, mostly due to multipath signals. Alternatively or additionally, residuals can also be grouped together based, for example, on their signal-to-noise ratio, residual magnitudes, azimuth angles and other measurement criteria or characteristics. The measurement criteria can be used to group off-line residual samples and to select at least one statistical model module 510 as in block 505, such as that shown in FIG. 5, for real-time residuals.

Though many actual pseudorange residual samples in FIG. 6 are corresponding to direct-path signals, some with a large magnitude corresponds to multipath signals. For the same target receiver, many pseudorange residuals in the same group are expected to follow the same statistical distribution or representation. For illustration purposes, FIG. 6 divides the pseudorange residuals (or errors) into groups based on their elevation angle. Group 1 includes measurements whose elevation angle is below 20°, and group 4 for those with an elevation above 60°. Group 1 generally has the highest probability of having a large positive residual for the measurements, and the measurements in Group 4 appear to be derived from normal signals.

Figure 7:
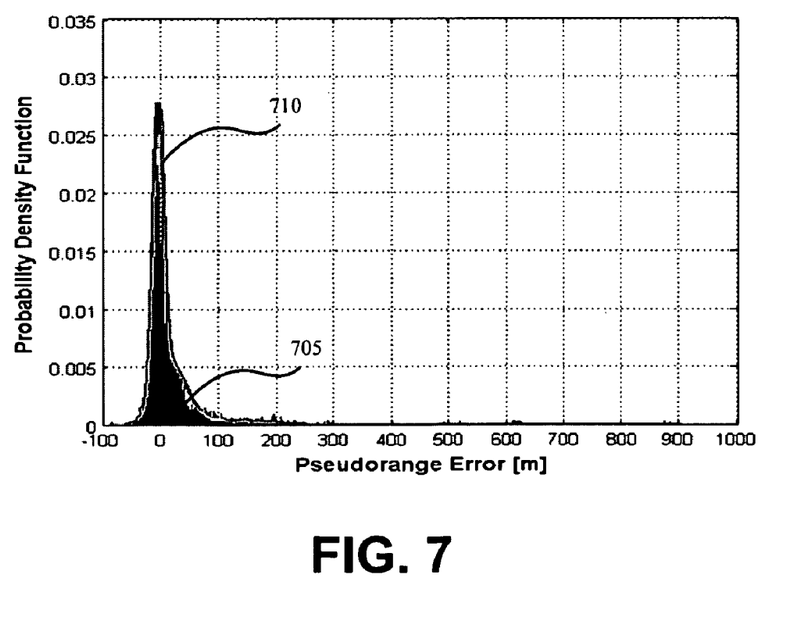
FIG. 7 is an exemplary graph illustrating a Gaussian mixture model describing group 1 of pseudorange errors of the pseudorange measurements, such as that shown in FIG. 6, the Gaussian mixture model of which can be used by the mitigating multipath manager, such as that shown in FIG. 3, to mitigate multipath signals.

FIG. 7 is an exemplary graph illustrating a Gaussian mixture model describing group 1 of pseudorange errors of the pseudorange measurements, such as that shown in FIG. 7, the Gaussian mixture model of which can be used in the mitigating multipath manager, such as that shown in FIG. 3, to mitigate multipath signals. Vertical bars 705 represent the actual distribution, while the smooth curve 710 represents the PDF model or representation approximating the actual distribution. Since actual distribution based on collected data cannot be easily processed for practical usage, the actual distribution can be approximated by some well-known distribution. Generally, any reasonable PDF models can be used to describe the vertical bars 705. The PDF models include, but are not limited to, Gaussian mixture models, which can be used to approximate the distribution. An expectation maximum (EM) method, for example, can be applied to estimate parameters of the Gaussian mixture. The PDF model of the Gaussian mixture can be generally expressed as $$P(r) = \sum_{i=1}^{n} p_i \frac{1}{\sqrt{2\pi}\,\sigma_i} e^{-\frac{(r-m_i)^2}{2\sigma_i^2}} \quad \text{(Eq. 1)}$$

where, r refers to the value of a pseudorange residual, n refers to the number of Gaussian components, $p_i$, $m_i$ and $\sigma_i$ refer to the probability, mean and standard deviation of the $i^{th}$ Gaussian component, respectively. In this example, a four-Gaussian mixture model 710 is used to describe the vertical bars 705 of the pseudorange residuals in Group 1. Alternatively or additionally, a different Gaussian mixture, possibly with a different number of components, can be constructed for each of the other groups, such as that shown in FIG. 7. For example, a one-Gaussian mixture model can be used to approximate the distribution for Group 4.

Figure 8:
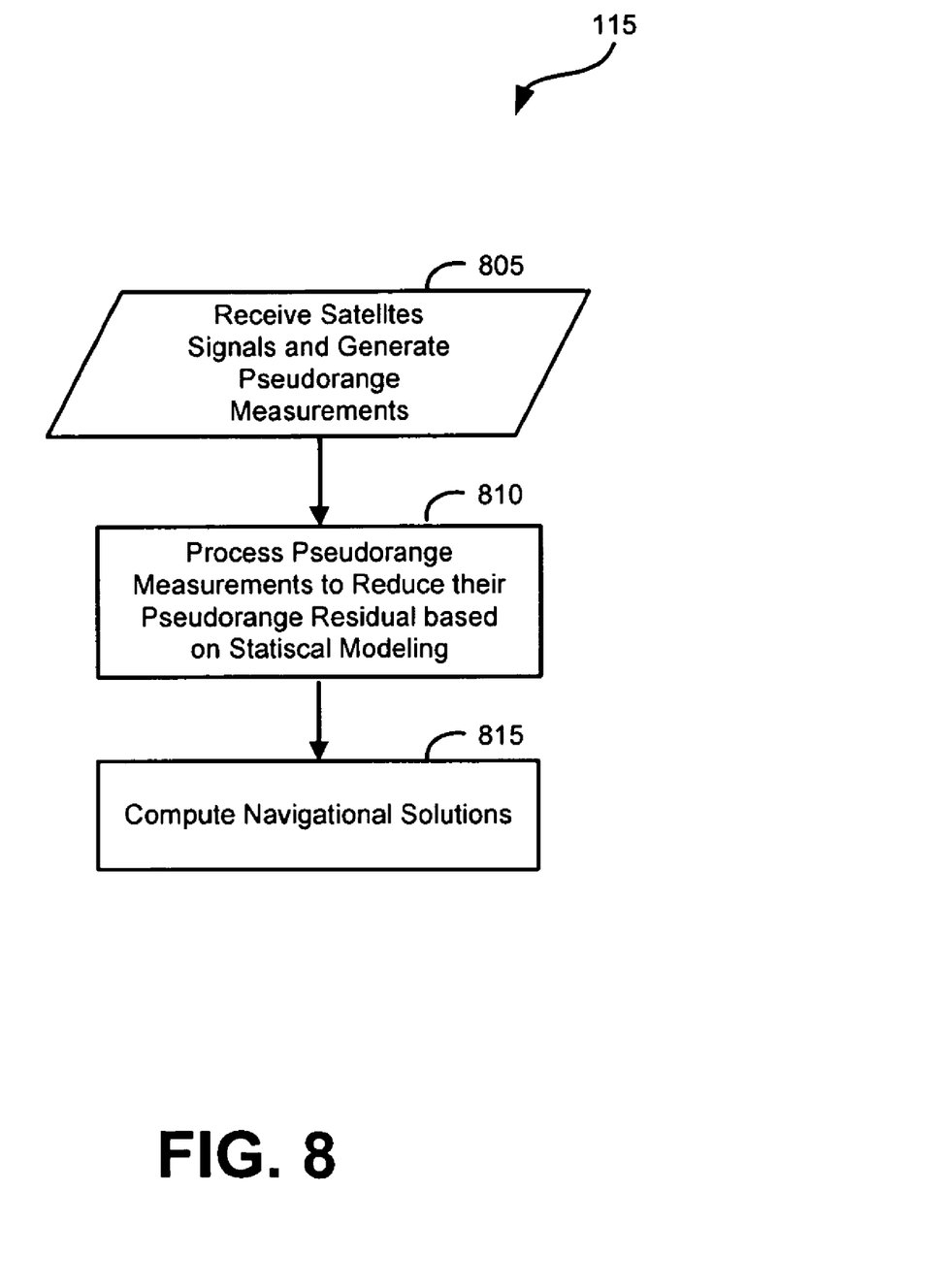
FIG. 8 is a high-level flow diagram that illustrates an embodiment of the architecture, functionality, and/or operation of the receiver, such as that shown in FIG. 1, for mitigating multipath signals and processing navigational solutions.

FIG. 8 is a high-level flow diagram that illustrates an embodiment of the architecture, functionality, and/or operation of the receiver 115, such as that shown in FIG. 1, for mitigating multipath signals and processing navigational solutions. At step 805, the receiver 115 receives satellites signals and processes pseudorange measurements based on the satellites signals. Step 810 processes the generated pseudorange measurements to reduce their pseudorange residuals based on statistical modeling in order to mitigate multipath signals. Step 815 computes navigation solutions based on the processed pseudorange measurements.

Figure 9:
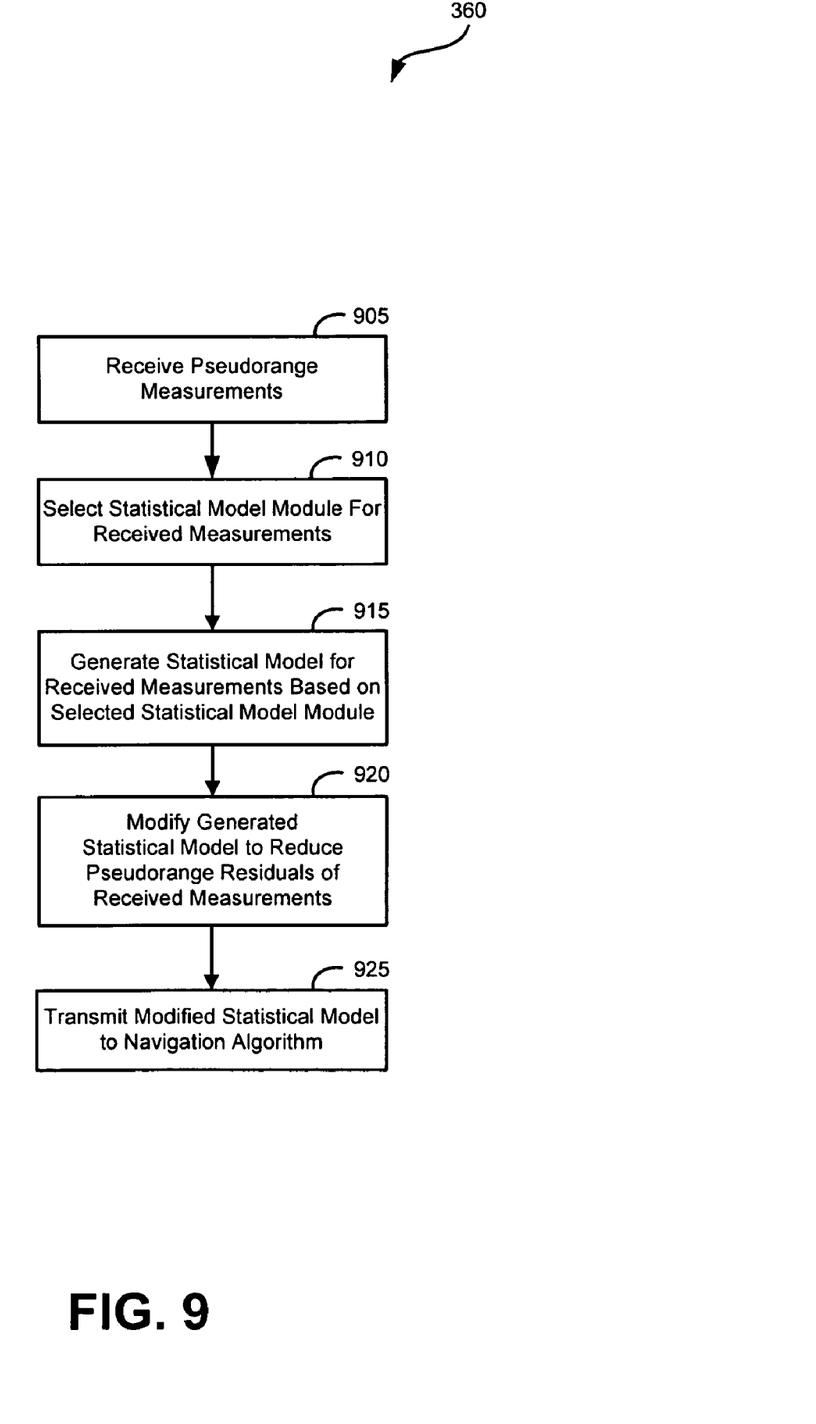
FIG. 9 is a detailed flow diagram that illustrates an embodiment of the architecture, functionality, and/or operation of the mitigating multipath manager, such as that shown in FIG. 3.

FIG. 9 is a flow diagram that illustrates an embodiment of the architecture, functionality, and/or operation of the mitigating multipath manager 360, such as that shown in FIG. 3, for mitigating multipath signals. At step 905, the mitigating multipath manager 360 receives pseudorange measurements as well as their residuals. Step 910 selects a statistical model module 510 for generating a statistical representation to describe the received pseudorange measurements. It should be noted that the statistical model module is generally generated offline.

Step 915 generates the statistical representation to describe the received pseudorange measurements based on the selected statistical model module. Step 920 modifies the generated statistical representation to reduce the pseudorange residuals of the received pseudorange measurements. Step 925 transmits the modified statistical representation of the received pseudorange measurements to the navigational algorithm 430, such as that shown in FIG. 4.

Step 920 can modify the generated statistical representation using two methods based on Gaussian mixture model, among others, such as that described in relation to FIG. 7. The first method is to split the received pseudorange measurement into multiple components in which each component corresponds to a respective Gaussian component. For example, once an n-Gaussian mixture model is selected to describe the pseudorange measurement, as in step 910, the pseudorange measurement can be represented as n measurement components. For the $i^{th}$ measurement components corresponding into the $i^{th}$ Gaussian component, its residual is $r-m_i$ with a standard deviation of $\sigma_i$. The $i^{th}$ component further has an association probability using the following equation:

$$p_i \frac{1}{\sqrt{2\pi}\,\sigma_i} e^{-\frac{(r-m_i)^2}{2\sigma_i^2}} \quad \text{(Eq. 2)}$$

further normalized by P(r) in Equation (1). Each component is delivered to and processed by the navigation algorithm 430 in a similar manner as receiving pseudorange measurements that have not been through the process of statistical modeling. Alternatively or additionally, the navigation algorithm can be modified to de-weight the association probability of the $i^{th}$ component.

The second method is to transform the received pseudorange residual into an effective residual with an associated variance based on the Gaussian mixture model. For example, if an n-Gaussian mixture model is used, the effective residual, $r_{eff}$, and variance, $\sigma_{eff}^2$, can be calculated using the following equations, respectively:

$$r_{eff} = \frac{1}{P(r)} \sum_{i=1}^{n} p_i \frac{1}{\sqrt{2\pi}\sigma_i} e^{-\frac{(r-m_i)^2}{2\sigma_i^2}} (r-m_i) \quad \text{(Eq. 3)}$$

$$\sigma_{eff}^2 = \frac{1}{P^2(r)} \sum_{i=1}^{n} \left( p_i \frac{1}{\sqrt{2\pi}\sigma_i} e^{-\frac{(r-m_i)^2}{2\sigma_i^2}} \right)^2 \sigma_i^2 \quad \text{(Eq. 4)}$$

where, $P^2(r)$ in Equation (4) is not equal to $P(r)$ square but defined as follows:

$$P^2(r) = \sum_{i=1}^{n} \left( p_i \frac{1}{\sqrt{2\pi}\sigma_i} e^{-\frac{(r-m_i)^2}{2\sigma_i^2}} \right)^2 \quad \text{(Eq. 5)}$$

Thus, a measurement is transformed into an effective measurement. Such effective measurement is delivered to and processed by the navigation algorithm 430 in a similar manner as receiving pseudorange measurements that have not been through the process of statistical modeling.

Based on Equations 3, 4, and 5, mitigating multipath can be achieved by reducing pseudorange residuals. When residual r is large, Equation 2 provides that the Gaussian component whose mean $m_i$ is closest to r may have a highest probability and then can potentially be a dominant component. If $m_i$ of the dominant component is large, representing a multipath component, then this component statistical representation can greatly reduce the residual from r to $r-m_i$. If $m_i$ of the dominant component is small, mostly probably representing a normal direct-path signal, then $r-m_i$ may not be different from the original r, meaning that the measurement may change little to none.

Alternatively or additionally, though the statistical representation can generally represent measurements having mostly direct-path without significant change, the measurements can be passed directly to the navigation algorithm 430 without the process of statistical modeling. For example, if a measurement residual lies in Group 4 of FIG. 6, then this measurement can be determined to be a good measurement and directly delivered to the navigation algorithm 430. Alternatively or additionally, if a measurement belongs to groups with a small residual, for example, group 3 of FIG. 6, then the measurement can also be determined not to be processed by statistical modeling. The suggested criteria for measurements not being processed by statistical modeling can include parameters, such as, for example, high elevation, small residual, and/or high signal-to-noise ratio, among others. The parameters can be compared with corresponding thresholds, and then the multipath mitigation manager 360 determines whether to select a statistical model module 510 to process the measurements. The process of selecting some proper criteria and thresholds is refined via numerous navigation performance testing and analyses. Additionally, included in this disclosure is an embodiment of a receiver that mitigates multipath effects, as discussed in U.S. patent application Ser. No. 10/237,556, filed on Sep. 6, 2002, entitled "System and Method To Estimate the Location of a Receiver in a Multi-Path Environment." The '556 application discloses, among others, a method that generate, transform, and fuse signal and receiver constraints to obtain a final estimate of receiver variables in a way that mitigates multipath effects.

Figure 10:
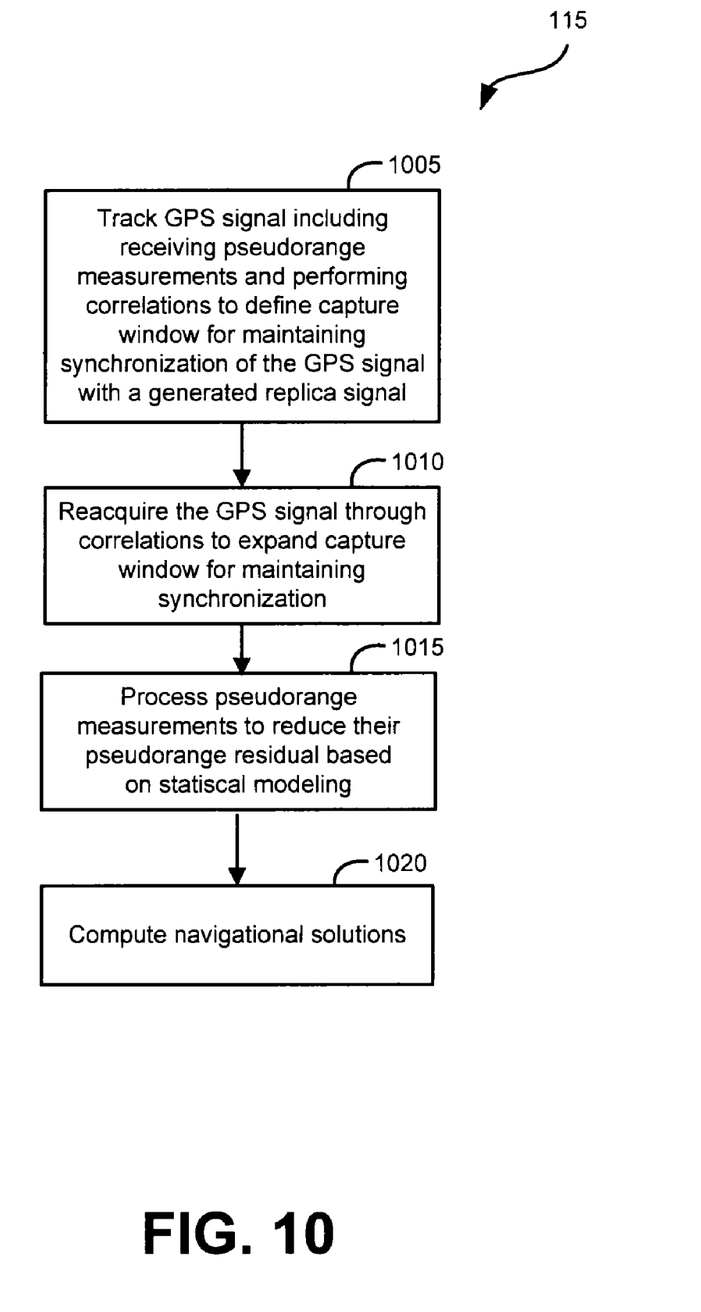
FIG. 10 is a high-level flow diagram that illustrates an embodiment of the architecture, functionality, and/or operation of the receiver, such as that shown in FIG. 1, for mitigating multipath signals and processing navigational solutions.

FIG. 10 depicts one embodiment of the present disclosure. Box 1005 discloses tracking a GPS signal including receiving pseudorange measurements and performing correlations to define a capture window for maintaining synchronization of the GPS signal with a generated replica signal. Box 1010 discloses reacquiring the GPS signal through correlations to expand the capture window for maintaining synchronization. Box 1015 discloses processing the pseudorange measurements to reduce their pseudorange residual based on statistical modeling. Additionally, Box 1020 discloses computing navigational solutions based on the GPA signal and the processed pseudorange measurements.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A receiver comprising:
   an antenna being configured to receive signals from a plurality of satellites; and
   a computing device being configured to:
      generate pseudorange measurements based on the received satellites signals;
      process the generated pseudorange measurements to reduce their pseudorange residuals based on statistical modeling in order to mitigate multipath errors, and
      compute navigation solutions based on the processed pseudorange measurements.

2. The receiver as defined in claim 1, further comprising a radio frequency front end unit being configured to down-convert, magnify, filter, and digitize the received satellites signals into digital immediate frequency (IF) signals.

3. The receiver as defined in claim 2, further comprising a baseband digital signal processing (DSP) unit that acquires and tracks the received satellites signals and then generates pseudorange measurements according to the received satellites signals.

4. The receiver as defined in claim 1, wherein the computing device processes the received pseudorange measurements by way of selecting a statistical model module that generates a statistical representation to describe the received pseudorange measurements.

5. The receiver as defined in claim 4, wherein the statistical model module corresponding with the pseudorange residuals are pre-computed based on off-line test data samples.

6. The receiver as defined in claim 5, wherein at least one set of statistical model module is built for each different group of pseudorange residuals, the pseudorange residuals being grouped based on corresponding signals elevation, signal-to-noise ratio and residual magnitude.

7. The receiver as defined in claim 6, wherein the statistical model module utilizes a Gaussian mixture, the statistical model module being used to approximate the actual distribution of residual samples for each group of residuals.

8. The receiver as defined in claim 4, wherein the computing device processes the received pseudorange measurements by way of modifying the generated statistical representation to reduce the pseudorange residuals of the received pseudorange measurements.

9. The receiver as defined in claim 8, wherein the computing device modifies the generated statistical representation by way of transforming each received pseudorange measurement into multiple pseudorange measurement components, each measurement component corresponding to a respective Gaussian component in a selected Gaussian mixture model.

10. The receiver as defined in claim 9, wherein each component has an association probability corresponding to the pseudorange residuals of the received pseudorange measurements.

11. The receiver as defined in claim 10, wherein the computing device computes the navigation solutions, in part, by way of de-weighting the association probability of each component.

12. The receiver as defined in claim 8, wherein the computing device modifies the generated pseudorange measurements by way of computing an effective residual and variance of the generated statistical model corresponding to the received pseudorange measurements.

13. The receiver as defined in claim 12, wherein the computing device computes the navigation solutions based on the received effective residual and variance.

14. A method for mitigating multipath signals in a receiver, comprising:
  receiving the pseudorange measurements;
  processing the received pseudorange measurements to reduce their pseudorange residuals based on statistical modeling in order to mitigate multipath errors; and
  computing navigation solutions based on the processed pseudorange measurements.

15. The method as defined in claim 14, wherein processing the received pseudorange measurements comprises selecting a statistical model module that generates a statistical representation to describe for the received pseudorange measurements.

16. The method as defined in claim 15, wherein processing the received pseudorange measurements comprises modifying the generated statistical representation to reduce the pseudorange residuals of the received pseudorange measurements.

17. The method as defined in claim 16, wherein modifying the generated statistical representation comprises splitting the generated statistical representation of the received pseudorange measurements into multiple components, each component having an association probability corresponding to the pseudorange residuals of the received pseudorange measurements.

18. The method as defined in claim 17, wherein computing the navigation solutions includes de-weighting the association probability of each component.

19. The method as defined in claim 16, wherein modifying the generated statistical representation comprises computing an effective residual and variance of the generated statistical model corresponding to the received pseudorange measurements.

20. The method as defined in claim 19, wherein computing the navigational solutions is based on the computed effective residual and variance.

21. The method as defined in claim 14, further comprising:
  determining whether the received pseudorange measurements have a certain value of multipath signals; and
  responsive to determining that the received pseudorange measurements have the certain value of multipath signals, computing navigation solutions based on the received pseudorange measurements without the step of processing the received pseudorange measurement.

22. The method as defined in claim 21, wherein determining whether the received pseudorange measurements have the certain value of multipath signals comprises determining whether the received pseudorange measurements pass at least one threshold corresponding to at least one of elevation, signal-to-noise ratio and residual magnitude, and responsive to determining that the received pseudorange measurements passed the at least one threshold corresponding to at least one of elevation, signal-to-noise ratio and residual magnitude, computing navigation solutions based on the received pseudorange measurements without the step of processing the received pseudorange measurement, wherein the elevation, signal-to-noise ratio and residual magnitude thresholds is derived mostly based on enormous navigation performance testing and analyses.

23. A navigation system comprising:
  a plurality of satellites that transmit signals; and
  a receiver comprising:
    an antenna being configured to receive signals from a plurality of satellites, and
    a computing device being configured to:
    generate pseudorange measurements based on the received satellites signals,
    select a statistical model module for the received pseudorange measurements,
    generate a statistical representation to describe the received pseudorange measurements based on the selected statistical model module,
    modify the generated statistical representation to reduce the pseudorange residuals of the received pseudorange measurements in order to mitigate multipath errors, and
    compute navigation solutions based on the modified statistical representation of the received pseudorange measurements.

24. The navigation system as defined in claim 23, wherein the computing device modifies the generated statistical representation by way of splitting the received pseudorange measurements into multiple components, each component having an association probability corresponding to the pseudorange residuals of the received pseudorange measurements, the computing device being configured to de-weight the association probability of each component and computes the navigational solutions based, in part, on the de-weighted multiple components.

25. The navigation system as defined in claim 23, wherein the computing device modifies the generated statistical representation by way of computing an effective residual and variance corresponding to the generated statistical representation of the received pseudorange measurements, the computing device being configured to compute the navigational solutions based on the computed effective residual and variance.

26. A method for global positioning system (GPS) navigation, the method comprising:
tracking at least one GPS signal from a GPS satellite, including receiving the pseudorange measurements and performing a series of early correlation, a series of prompt correlations, and a series of late correlations to define a capture window for maintaining synchronization of the at least one GPS signal with a generated replica signal;
reacquiring the at least one GPS signal, including performing a plurality of additional early correlations and a plurality of additional late correlations so as to create an expanded capture window for maintaining the synchronization;
processing the received pseudorange measurements, in response to the tracking at least one GPS signal and the reacquiring at least one GPS signal, to reduce their pseudorange residuals based on statistical modeling in order to mitigate multipath errors; and
computing navigation solutions based on the processed pseudorange measurements.

27. The method as defined in claim 26, wherein performing the plurality of additional early correlations and the plurality of additional late correlations comprises: generating a plurality of code samples that are correlated with the at least one GPS signal; and delaying each of the plurality of code samples by a multiple of a fraction of a chip to generate a plurality of early code samples, and a plurality of late code samples, wherein adjoining code samples are offset by the fraction of a chip.

28. The method as defined in claim 26, wherein performing the plurality of additional early correlations and the plurality of additional late correlations comprises: generating a plurality of code samples that are correlated with the at least one GPS signal; and delaying each of the plurality of code samples by a multiple of a fraction of a chip to generate a plurality of early code samples, and a plurality of late code samples, wherein adjoining code samples are offset by a multiple of the fraction of a chip.

29. A method for global positioning system (GPS) navigation, the method comprising:
tracking at least one GPS signal from a GPS satellite, including receiving the pseudorange measurements and performing a series of early correlation, a series of prompt correlations, and a series of late correlations to define a capture window for maintaining synchronization of the at least one GPS signal with a generated replica signal;
processing the received pseudorange measurements, in response to the tracking at least one GPS signal, to reduce their pseudorange residuals based on statistical modeling in order to mitigate multipath errors; and
computing navigation solutions based on the processed pseudorange measurements.

30. A receiver comprising:
means for receiving signals from a plurality of satellites;
means for generating pseudorange measurements based on the received signals;
means for processing the generated pseudorange measurements to reduce pseudorange residuals based at least in part on statistical modeling that mitigates multipath errors; and
means for computing navigation solutions based at least in part on the processed pseudorange measurements.

31. The receiver as defined in claim 30, further comprising means to down-convert, magnify, filter, and digitize the received signals into digital immediate frequency (IF) signals.

32. The receiver as defined in claim 30, further comprising means for acquiring and tracking the received signals and generating pseudorange measurements according to the received signals.

33. The receiver as defined in claim 30, further comprising:
means for generating a statistical representation to describe the received pseudorange measurements based on the selected statistical model; and
means for modifying the generated statistical representation to reduce the pseudorange residuals of the received pseudorange measurements in order to mitigate multipath errors.

34. The receiver as defined in claim 33, further comprising means for modifying the generated statistical representation by transforming each received pseudorange measurement into multiple pseudorange measurement components, wherein each pseudorange measurement component corresponds to a respective Gaussian component in a selected Gaussian mixture model.

35. The receiver as defined in claim 33, further comprising means for modifying the generated pseudorange measurements by computing an effective residual and variance of the generated statistical representation corresponding to the received pseudorange measurements.

* * * * *